(12) United States Patent
Nakayama

(10) Patent No.: US 12,556,010 B2
(45) Date of Patent: Feb. 17, 2026

(54) MANAGEMENT DEVICE AND POWER SUPPLY SYSTEM

(71) Applicant: SANYO Electric Co., Ltd., Osaka (JP)

(72) Inventor: Masato Nakayama, Hyogo (JP)

(73) Assignee: SANYO Electric Co., Ltd., Osaka (JP)

(*) Notice: Subject to any disclaimer, the term of this patent is extended or adjusted under 35 U.S.C. 154(b) by 724 days.

(21) Appl. No.: 17/905,636

(22) PCT Filed: Nov. 19, 2020

(86) PCT No.: PCT/JP2020/043108
§ 371 (c)(1),
(2) Date: Sep. 4, 2022

(87) PCT Pub. No.: WO2021/186795
PCT Pub. Date: Sep. 23, 2021

(65) Prior Publication Data
US 2023/0147606 A1    May 11, 2023

(30) Foreign Application Priority Data
Mar. 18, 2020 (JP) .................. 2020-047291

(51) Int. Cl.
*H02J 7/00* (2006.01)
*G01R 31/3835* (2019.01)
(Continued)

(52) U.S. Cl.
CPC ........ *H02J 7/0016* (2013.01); *G01R 31/3835* (2019.01); *G01R 31/396* (2019.01);
(Continued)

(58) Field of Classification Search
CPC ...... H02J 3/381; H02J 2207/20; H02J 7/0063; H02J 2300/26; H02J 7/0014; H02J 9/061;
(Continued)

(56) References Cited

U.S. PATENT DOCUMENTS

2015/0008748 A1* 1/2015 Deboy .............. H02M 7/53871
307/77
2016/0261127 A1* 9/2016 Worry ................... H02J 7/0029
(Continued)

FOREIGN PATENT DOCUMENTS

WO    2017/208740    12/2017

OTHER PUBLICATIONS

International Search Report of PCT application No. PCT/JP2020/043108 dated Feb. 9, 2021.

*Primary Examiner* — Binh C Tat
(74) *Attorney, Agent, or Firm* — WHDA, LLP

(57) ABSTRACT

In management device, voltage measurement circuit measures a voltage of each of a plurality of cells connected in series. A plurality of voltage measurement lines connect between respective nodes of the plurality of cells and respective voltage measurement terminals of voltage measurement circuit. A lower reference potential line connects between a lower node of lowermost cell of the plurality of cells and a lower reference terminal of voltage measurement circuit. Voltage dividing resistor is connected between a predetermined fixed potential and lowermost voltage measurement line. Controlling circuit monitors the voltage between a voltage dividing point potential of voltage dividing resistor and a lower reference potential of voltage measurement circuit, and diagnoses presence or absence of disconnection of lowermost voltage measurement line or the lower reference potential line.

9 Claims, 6 Drawing Sheets

(51) Int. Cl.
*G01R 31/396* (2019.01)
*H01M 10/42* (2006.01)
*H01M 10/48* (2006.01)

(52) U.S. Cl.
CPC ....... *H01M 10/425* (2013.01); *H01M 10/482* (2013.01); *H02J 7/0048* (2020.01); *H01M 2010/4271* (2013.01)

(58) Field of Classification Search
CPC ...... H02J 7/1423; H02J 7/0049; H02J 7/0032; H02J 7/06; H02J 7/00714; H02J 7/0068; H02J 7/00712; H02J 7/007182; H02J 7/0016; H02J 7/0048; H02J 7/0029; H02J 7/00304; H02J 7/005; H02J 7/02; H01M 2220/20; G01R 31/396; G01R 31/3842; G01R 31/3835; G01R 19/16542; G01R 31/389; G01R 31/52; G01R 31/54
USPC .................................................. 320/106–122
See application file for complete search history.

(56) References Cited

U.S. PATENT DOCUMENTS

| | | | |
|---|---|---|---|
| 2019/0214845 A1* | 7/2019 | Hausman, Jr. | ............ E06B 9/38 |
| 2019/0285669 A1 | 9/2019 | Furukawa | |

* cited by examiner

MANAGEMENT DEVICE AND POWER SUPPLY SYSTEM

TECHNICAL FIELD

The present disclosure relates to a management device that manages a state of a plurality of cells connected in series, and a power supply system.

BACKGROUND ART

In recent years, hybrid vehicles (HV), plug-in hybrid vehicles (PHV), and electric vehicles (EV) are becoming popular. Secondary batteries are installed as key devices in these electric vehicles. In-vehicle secondary batteries in wide use mainly include nickel metal hydride batteries and lithium ion batteries. It is expected that in future, spreading use of lithium ion batteries with high energy density will accelerate.

Normally, in an in-vehicle secondary battery, the voltage, temperature, and current of the battery are constantly monitored from the viewpoint of ensuring safety. In particular, in the lithium ion battery, since the normal region and the use prohibited region are close to each other, strict voltage management is required, and the voltage is measured for each cell. The measured cell voltage is used for state of charge (SOC) management, equalization control, and the like.

A voltage measurement circuit (configured by an application specific integrated circuit (ASIC), for example) of a cell is connected, by a voltage measurement line, to each node of a plurality of cells connected in series constituting a battery module. The voltage measurement circuit measures the voltage of each cell by measuring the voltage between two adjacent voltage measurement lines.

In a configuration in which the ground potential of the battery module and the voltage measurement circuit is common, in order to highly accurately measure the voltage of the lowermost cell, it is necessary to connect a voltage measurement line to a lower node of the lowermost cell (hereinafter, referred to as lowermost voltage measurement line) in addition to the ground potential line (see, for example, PTL 1). This makes it possible to eliminate the influence of voltage drop due to the current flowing through the ground potential line from the measurement voltage of the lowermost cell.

In a general voltage measurement circuit that measures the voltage of each cell by switching a plurality of measurement channels and sharing one A/D converter, a switching circuit is configured based on a ground potential, and a path through which a current flows from the lowermost voltage measurement line to the ground potential line is formed via a parasitic diode or the like of an FET. Even when a current flows from the lowermost voltage measurement line to the ground potential line, the potential of the lowermost voltage measurement line does not become higher than the potential of the ground potential line by greater than or equal to a certain voltage (for example, forward voltage Vf of the diode), and is clamped at a potential higher than the potential of the ground potential line by a certain voltage even when a large current flows.

In order to ensure that the voltage measurement of the cell is normally performed, a mechanism for detecting disconnection of the voltage measurement line is required. For example, there is a method of detecting disconnection of a voltage measurement line by applying a current to the voltage measurement line and detecting a change in the measurement voltage. When the voltage measurement line is disconnected, the measurement voltage when the current flows greatly drops. As a method of applying a current to the voltage measurement line, there are a method of using a discharge circuit for equalization connected in parallel to the cell and a method of using a predetermined current source.

In a case where a current path is formed from the lowermost voltage measurement line to the ground potential line, the measurement voltage of the lowermost cell does not greatly drop even when the lowermost voltage measurement line is disconnected. It only drops by forward voltage Vf (usually, to 0.7 V) of the diode between the lowermost voltage measurement line and the ground potential line. While the vehicle is moving, the cell voltage may fluctuate in a range of about 4.2 V to 3 V. In this case, it is difficult to determine whether the drop in the measurement voltage of the lowermost cell is caused by disconnection or caused by voltage fluctuation due to moving of the vehicle.

In general, protection diodes are inserted in opposite directions between the voltage measurement terminals of the voltage measurement circuit and the ground potential. A filter resistor for constituting a filter and a discharge resistor for equalizing discharge are connected to each voltage measurement terminal of the voltage measurement circuit.

At the time of disconnection of the ground potential line, the consumption current of the voltage measurement circuit itself flows into the voltage measurement terminal through the protection diode, and the current flows into the cell through the filter resistor and the discharge resistor. Due to this, the measurement voltage of the lowermost cell drops by the voltage drop due to the current flowing through the filter resistor and the discharge resistor. Also in this case, it is difficult to determine whether the drop in the measurement voltage of the lowermost cell is caused by disconnection or caused by voltage fluctuation due to moving of the vehicle.

CITATION LIST

Patent Literature

PTL 1: WO 2017/208740 A

SUMMARY OF THE INVENTION

The present disclosure has been made in view of such a situation, and an object of the present disclosure is to provide a technique capable of highly accurately detecting disconnection of a lowermost voltage measurement line or ground potential line of a voltage measurement circuit.

In order to solve the above problem, a management device according to an aspect of the present disclosure includes: a voltage measurement circuit that measures voltage of each of a plurality of cells connected in series; a plurality of voltage measurement lines that connect between respective nodes of the plurality of cells and respective voltage measurement terminals of the voltage measurement circuit; a lower reference potential line that connects between a lower node of a lowermost cell of the plurality of cells and a lower reference terminal of the voltage measurement circuit; a voltage dividing resistor that is connected between a predetermined fixed potential and a lowermost voltage measurement line; and a controlling circuit that monitors voltage between a voltage dividing point potential of the voltage dividing resistor and a lower reference potential of the voltage measurement circuit and diagnoses presence or absence of disconnection of the lowermost voltage measurement line or the lower reference potential line.

According to the present disclosure, it is possible to highly accurately detect disconnection of a lowermost voltage measurement line or ground potential line of a voltage measurement circuit.

DESCRIPTION OF EMBODIMENT

Comparative Example

Figure 1:
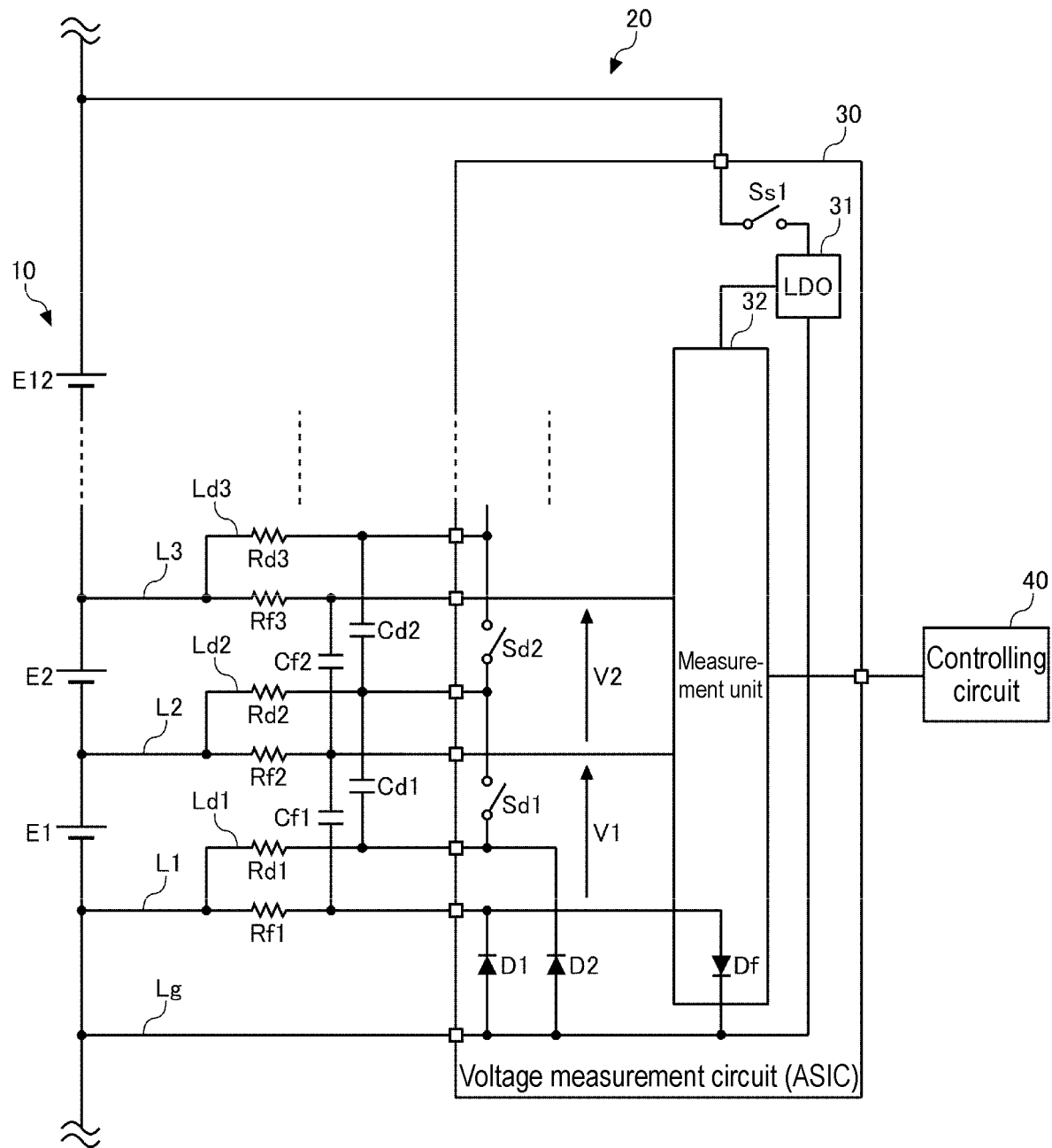
FIG. 1 is a view illustrating a configuration of a power supply system according to a comparative example.

FIG. 1 is a view illustrating the configuration of power supply system 1 according to a comparative example. Power supply system 1 is mounted on an electric vehicle and used as a battery for driving the electric vehicle. Power supply system 1 includes power storage module 10 and management device 20. Power storage module 10 includes a plurality of cells E1 to E12 connected in series. As the cell, a lithium ion battery cell, a nickel metal hydride battery cell, a lead battery cell, an electric double layer capacitor cell, a lithium ion capacitor cell, or the like can be used. Hereinafter, this description assumes an example where a lithium ion battery cell (nominal voltage: 3.6 V to 3.7 V) is used. In FIG. 1, since 12 cells E1 to E12 are connected in series, power supply system 1 of 48 V system is constructed. The number of series connections of cells is not limited to 12.

Management device 20 includes voltage measurement circuit 30 and controlling circuit 40. In this description, voltage measurement circuit 30 is configured by an ASIC that is a dedicated custom IC. Voltage measurement circuit 30 measures the voltage of each cell E1 to E12 by measuring the voltage between two adjacent voltage measurement lines. A detailed description will be given below.

Voltage measurement circuit 30 has a plurality of voltage measurement terminals. Each node of the plurality of cells E1 to E12 connected in series and the respective voltage measurement terminal of voltage measurement circuit 30 are connected by the voltage measurement line. In order to simplify the drawing, FIG. 1 only illustrates first voltage measurement line L1 connected to a negative node of first cell E1, second voltage measurement line L2 connected to a node between first cell E1 and second cell E2, and third voltage measurement line L3 connected to a positive node of second cell E2.

Filter resistors Rf1 to Rf3 are inserted into the plurality of voltage measurement lines L1 to L3, respectively. Capacitances Cf1 and Cf2 are respectively connected between two adjacent voltage measurement lines. Filter resistors Rf1 to Rf3 and capacitances Cf1 and Cf2 constitute a low-pass filter and suppress aliasing.

Voltage measurement circuit 30 has a plurality of discharge terminals. Each node of the plurality of cells E1 to E12 connected in series and the respective discharge terminal of voltage measurement circuit 30 are connected by a discharge line. In order to simplify the drawing, FIG. 1 only illustrates first discharge line Ld1 connected to a negative node of first cell E1, second discharge line Ld2 connected to a node between first cell E1 and second cell E2, and third discharge line Ld3 connected to a positive node of second cell E2.

Discharge resistors Rd1 to Rd3 are inserted into the plurality of discharge lines Ld1 to Ld3, respectively. Both ends of first cell E1 are connected via second discharge resistor Rd2, first discharge switch Sd1, and first discharge resistor Rd1. Second discharge resistor Rd2, first discharge switch Sd1, and first discharge resistor Rd1 constitute a discharge circuit connected in parallel with first cell E1. Both ends of second cell E2 are connected via third discharge resistor Rd3, second discharge switch Sd2, and second discharge resistor Rd2. Third discharge resistor Rd3, second discharge switch Sd2, and second discharge resistor Rd2 constitute a discharge circuit connected in parallel with second cell E2. Capacitances Cd1 and Cd2 are respectively connected between two adjacent discharge lines.

As first discharge switch Sd1 and second discharge switch Sd2, a semiconductor switch such as a metal oxide semiconductor field effect transistor (MOSFET) can be used. In the example illustrated in FIG. 1, first discharge switch Sd1 and second discharge switch Sd2 are provided in the ASIC.

Voltage measurement circuit 30 has a power source terminal and a ground potential terminal. The power source terminal is connected to a positive-electrode terminal of power storage module 10 via a power source line, and the ground potential terminal is connected to a negative-electrode terminal of power storage module 10 via ground potential line Lg.

Voltage measurement circuit 30 includes power source switch Ss1, low drop out (LDO) 31, and measurement unit 32. A positive-side reference potential terminal of LDO 31 is connected to a power source terminal of voltage measurement circuit 30 via power source switch Ss1. A negative-side reference potential terminal of LDO 31 is connected to a ground potential terminal of voltage measurement circuit 30. LDO 31 is a type of linear regulator, and steps down the voltage (48 V in this description) of power storage module 10 to generate an operating voltage (5 V in this description) of voltage measurement circuit 30. LDO 31 supplies the generated voltage to measurement unit 32.

Note that another type of DC/DC converter may be used instead of LDO 31. A DC/DC converter such as LDO 31 that generates the operating voltage of voltage measurement circuit 30 may be provided outside the ASIC.

A positive-side reference potential terminal of measurement unit 32 is connected to an output terminal of LDO 31. A negative-side reference potential terminal of measurement unit 32 is connected to the ground potential terminal of voltage measurement circuit 30. A negative electrode potential of power storage module 10, a negative-side reference potential of LDO 31, and a negative-side reference potential of measurement unit 32 are fixed to a common potential by ground potential line Lg, which is a lower reference potential line.

Measurement unit 32 includes a multiplexer and an A/D converter. The multiplexer outputs the voltages input to the respective measurement channels of the plurality of cells E1 to E12 to the A/D converter in a predetermined order. The A/D converter samples, at a predetermined timing an analog voltage input from the multiplexer, and converts the sampled analog voltage into a digital value. The voltage values of the plurality of cells E1 to E12 converted into digital values are transmitted to controlling circuit 40. Since voltage measurement circuit 30 has a high voltage with respect to controlling circuit 40, voltage measurement circuit 30 and controlling circuit 40 are connected by a communication line in an insulated state.

Forward diode Df is a diode formed between lowermost voltage measurement line L1 and ground potential line Lg in such an orientation that lowermost voltage measurement line L1 side is an anode and ground potential line Lg side is a cathode. For example, forward diode Df is constituted by a parasitic diode of an FET constituting a part of the multiplexer.

In the case of a design in which measurement unit 32 is provided with no multiplexer and is provided with an A/D converter for each measurement channel, no parasitic diode is formed between lowermost voltage measurement line L1 and ground potential line Lg. In this case, a diode element is connected as forward diode Df between lowermost voltage measurement line L1 and ground potential line Lg.

In voltage measurement circuit 30, first protection diode D1 is connected between each of the plurality of voltage measurement lines and ground potential line Lg in such an orientation that the voltage measurement line side is a cathode and ground potential line Lg side is an anode. In voltage measurement circuit 30, second protection diode D2 is connected between each of the plurality of discharge lines and ground potential line Lg in such an orientation that the discharge line side is a cathode and ground potential line Lg side is an anode. In order to simplify the drawing, FIG. 1 only illustrates first protection diode D1 between first voltage measurement line L1 and ground potential line Lg and second protection diode D2 between first discharge line Ld1 and ground potential line Lg.

In this description, controlling circuit 40 includes a microcomputer and a nonvolatile memory (for example, EEPROM or flash memory). Controlling circuit 40 can execute the equalizing process among the plurality of cells E1 to E12 based on the voltage values of the plurality of cells E1 to E12 received from voltage measurement circuit 30. In a general passive cell balance method, among the plurality of cells E1 to E12, the other cells are discharged up to the capacitance (hereinafter, referred to as target value) of the cell having the smallest capacitance. The target value may be defined by an actual capacitance, a state of charge (SOC), or a voltage. The target value may be defined by a dischargeable quantity or a rechargeable quantity.

Controlling circuit 40 sets the measurement value of the cell having the smallest capacitance among the plurality of cells E1 to E12 as a target value, and calculates a difference between the target value and the measurement value of each of the plurality of other cells. Controlling circuit 40 calculates a discharge amount of each of the plurality of other cells based on the respective calculated difference. Controlling circuit 40 calculates a discharge time of each of the plurality of other cells based on the respective calculated discharge amount. Controlling circuit 40 generates and transmits, to voltage measurement circuit 30, a control signal for an equalizing process including discharge times of the plurality of cells. Based on the control signal received from controlling circuit 40, voltage measurement circuit 30 controls each of the plurality of discharge switches to an ON state for a specified time.

Controlling circuit 40 has a diagnosis mode for diagnosing presence or absence of disconnection of the plurality of voltage measurement lines and ground potential line Lg. In this description, disconnection is not limited to physical wiring disconnection, and also includes electrical disconnection. For example, a connection failure between a harness constituting the voltage measurement line and a connector is also included in disconnection. In the diagnosis mode, the plurality of discharge switches are sequentially switched on.

When the disconnected voltage measurement line and the voltage measurement line immediately below the disconnected voltage measurement line are conducted by turning on the discharge switch, the measurement voltage of the cell connected to the two voltage measurement lines drops to approximately 0 V. For example, in a case where third voltage measurement line L3 is disconnected, when second discharge switch Sd2 is turned on, the potential of third voltage measurement line L3 is attracted to the potential of second voltage measurement line L2, and measurement voltage V2 of a second measurement channel drops to approximately 0 V. In a case where no disconnection has occurred, measurement voltage V2 of the second measurement channel is a voltage in which the voltage of second cell E2 is measured as it is.

Figure 2:
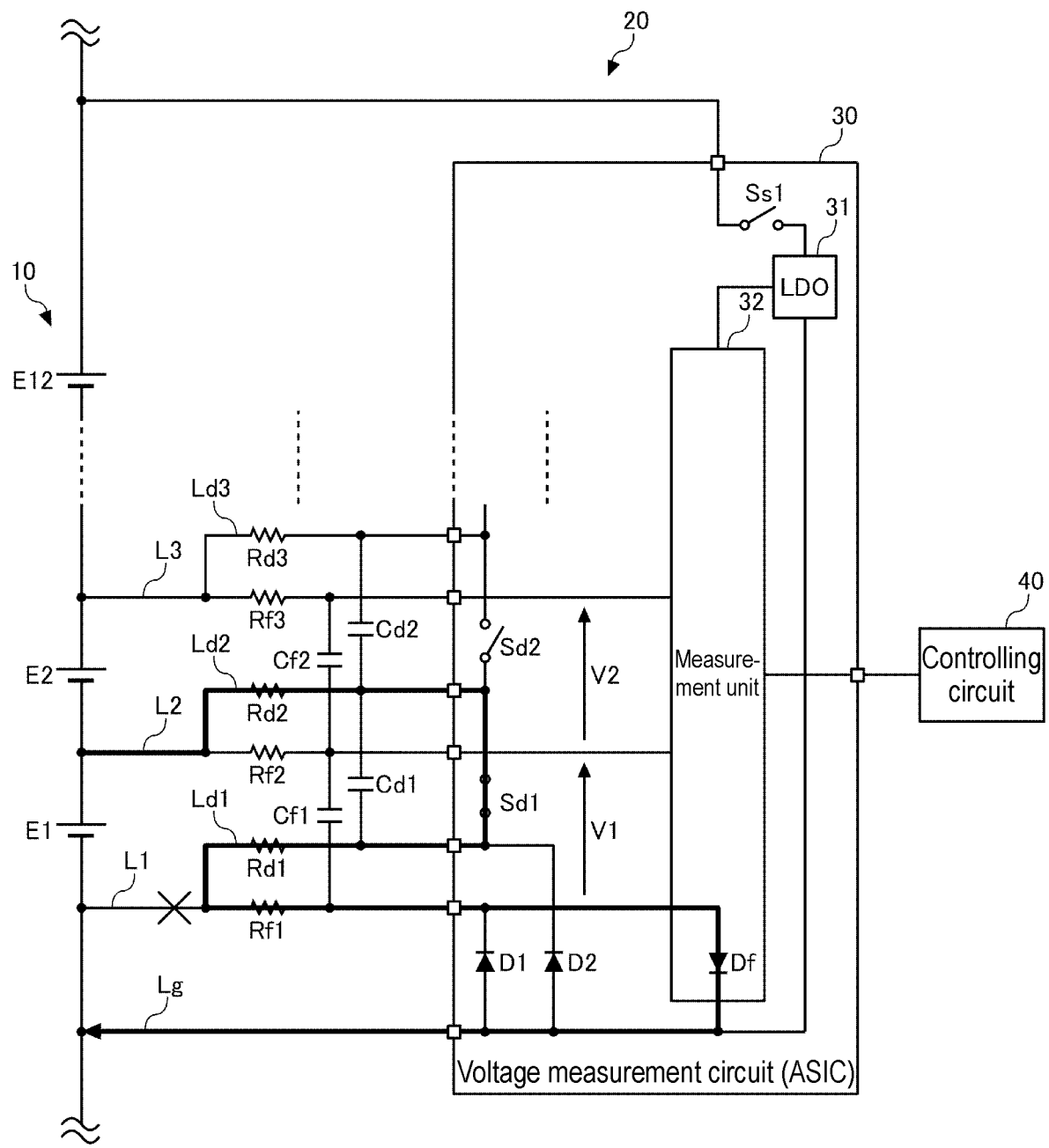
FIG. 2 is a view illustrating a current flowing in a diagnosis mode when a lowermost voltage measurement line is disconnected in the power supply system of FIG. 1.

FIG. 2 is a view illustrating a current flowing in the diagnosis mode when lowermost voltage measurement line L1 is disconnected in power supply system 1 of FIG. 1. When first discharge switch Sd1 is turned on in a state where lowermost voltage measurement line L1 is disconnected, a current flows from a positive-electrode terminal of first cell E1 to ground potential line Lg via second discharge resistor Rd2, first discharge switch Sd1, first discharge resistor Rd1, first filter resistor Rf1, and forward diode Df. In this case, measurement voltage V1 of a first measurement channel is a voltage in which forward voltage Vf of forward diode Df is subtracted from the voltage of first cell E1. In a case where no disconnection has occurred in lowermost voltage measurement line L1, measurement voltage V1 of the first measurement channel presents a voltage in which the voltage of first cell E1 is measured as it is.

In a case where forward voltage Vf of forward diode Df is, for example, about 0.7 V, the difference between the case where disconnection occurs in lowermost voltage measurement line L1 and the case where the disconnection does not occur in lowermost voltage measurement line L1 is about 0.7 V. In this case, it is difficult to determine whether the drop in measurement voltage V1 of lowermost cell E1 is caused by disconnection of lowermost voltage measurement line L1 or caused by load fluctuation. In the case of an electric vehicle, load fluctuation is large, and the cell voltage may fluctuate in a range of about 4.2 V to 3 V during moving.

Figure 3:
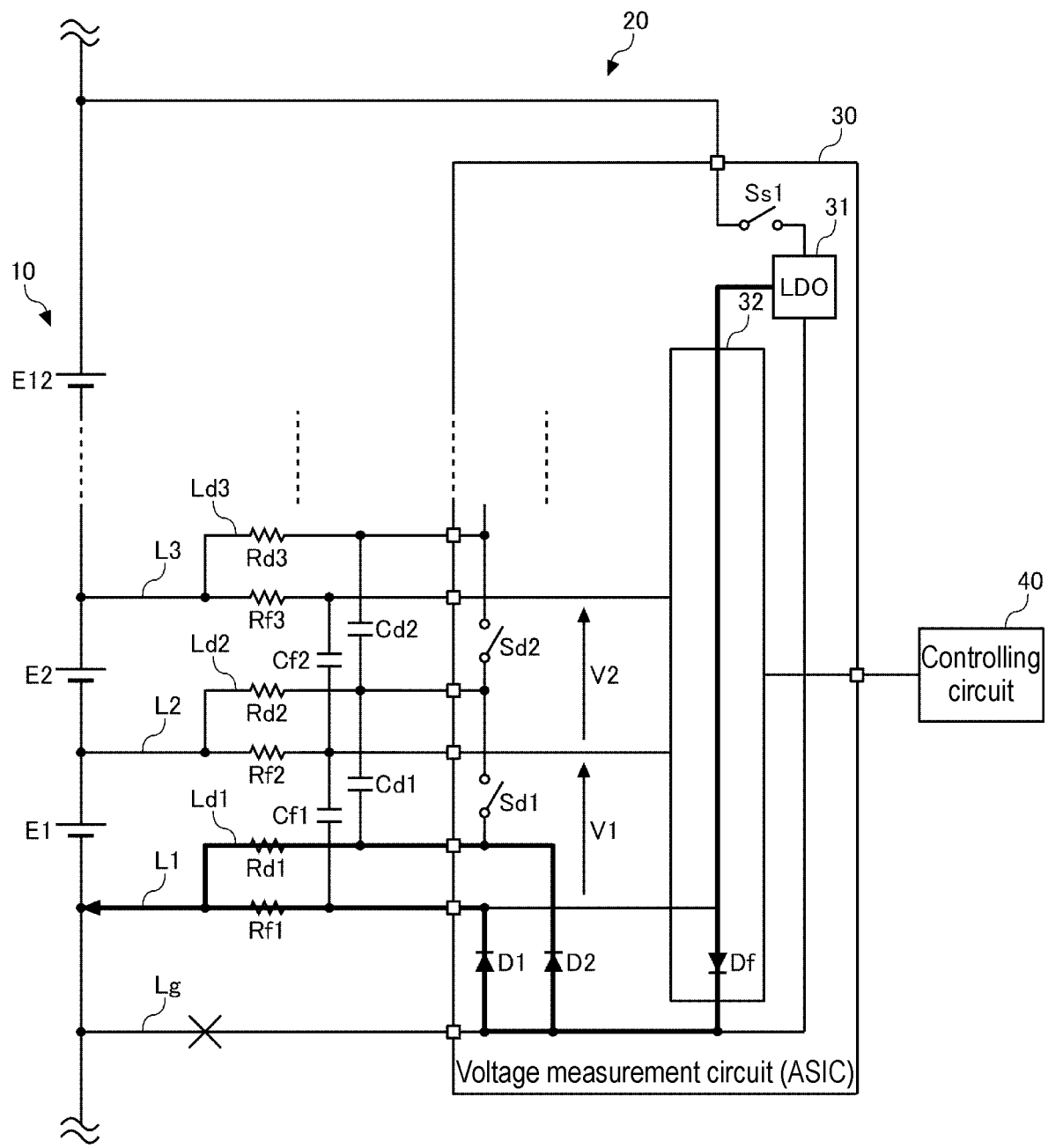
FIG. 3 is a view illustrating a current flowing when a ground potential line is disconnected in the power supply system of FIG. 1.

FIG. 3 is a view illustrating a current flowing when ground potential line Lg is disconnected in power supply system 1 of FIG. 1. When ground potential line Lg is disconnected, the consumption current of measurement unit 32 flows to the negative-electrode terminal of first cell E1 through two paths of a path of first protection diode D1 and first filter resistor Rf1, and a path of second protection diode D2 and first discharge resistor Rd1.

For example, a case where the value of first filter resistor Rf1 is 1 kΩ, the value of first discharge resistor Rd1 is 100Ω, and the consumption current of measurement unit 32 is 10 mA is considered. In this case, a current of about 0.9 mA flows through first filter resistor Rf1, and a current of about 9.1 mA flows through first discharge resistor Rd1. Hereinafter, first filter resistor Rf1 and first discharge resistor Rd1 are collectively referred to as terminal resistor. When a current flows through the terminal resistor, a voltage drop of about 0.9 V occurs. Due to this, the potential of lowermost voltage measurement line L1 rises by about 0.9 V. The width by which the potential of lowermost voltage measurement line L1 rises varies depending on the consumption current of measurement unit 32 and the value of the terminal resistor.

In a case where disconnection occurs in ground potential line Lg as described above, measurement voltage V1 of the first measurement channel is a voltage in which the voltage drop amount (about 0.9 V in the above example) due to the terminal resistor is subtracted from the voltage of first cell E1. In a case where no disconnection has occurred in ground potential line Lg, measurement voltage V1 of the first measurement channel presents a voltage in which the voltage of first cell E1 is measured as it is. Also in a case where ground potential line Lg is disconnected as described above, it is difficult to determine whether the drop in measurement voltage V1 of lowermost cell E1 is caused by disconnection of ground potential line Lg or caused by load fluctuation.

Exemplary Embodiment

Figure 4:
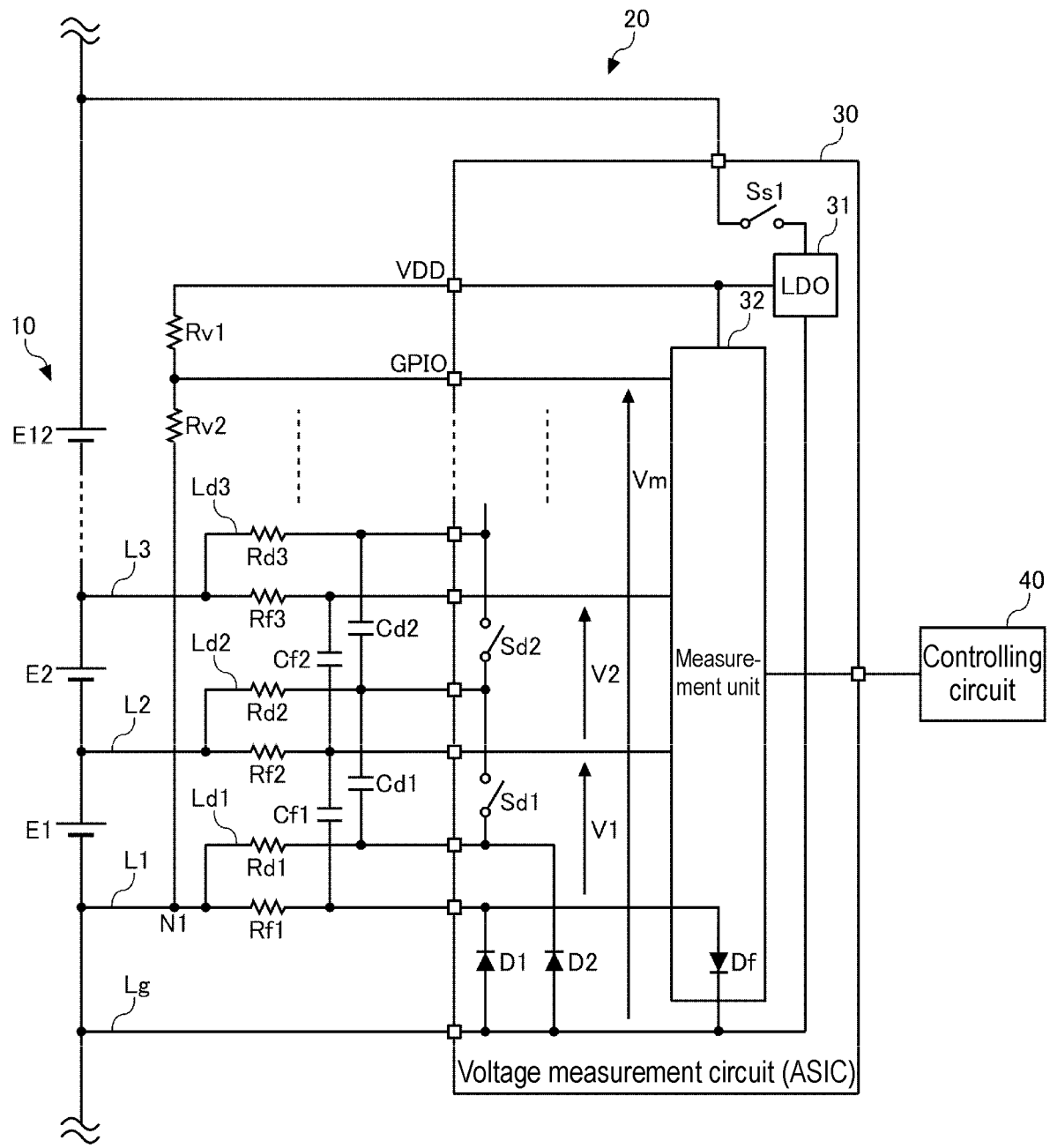
FIG. 4 is a view illustrating a configuration of a power supply system according to an exemplary embodiment.

FIG. 4 is a view illustrating the configuration of power supply system 1 according to an exemplary embodiment. Hereinafter, differences from the configuration of power supply system 1 according to the comparative example illustrated in FIG. 1 will be described. A voltage dividing resistor in which first voltage dividing resistor Rv1 and second voltage dividing resistor Rv2 are connected in series is connected between the output potential of LDO 31 and lowermost voltage measurement line L1. The lower side of the voltage dividing resistor is connected to node N1 of lowermost voltage measurement line L1 on lowermost cell E1 side relative to first filter resistor Rf1. The voltage dividing point of the voltage dividing resistor is connected to an analog general-purpose input/output terminal (GPIO) of voltage measurement circuit 30. Measurement unit 32 constantly measures, as monitoring voltage Vm, the voltage between the voltage dividing point potential of the voltage dividing resistor and the lower reference potential (ground potential) of voltage measurement circuit 30.

Controlling circuit 40 can diagnose the presence or absence of disconnection of lowermost voltage measurement line L1 or ground potential line Lg by monitoring measured monitoring voltage Vm. When measured monitoring voltage Vm is higher than monitoring voltage Vm at the normal time by greater than or equal to a first set value, controlling circuit 40 diagnoses that lowermost voltage measurement line L1 is disconnected. When measured monitoring voltage Vm is lower than monitoring voltage Vm in the normal state by greater than or equal to a second set value, controlling circuit 40 diagnoses that ground potential line Lg is disconnected.

Hereinafter, an example in which the same resistor of 100 kΩ is used for first voltage dividing resistor Rv1 and second voltage dividing resistor Rv2 will be considered. The output potential of LDO 31 is 5 V. In a state where lowermost voltage measurement line L1 and ground potential line Lg are not disconnected, lowermost voltage measurement line L1 and ground potential line Lg have the same potential. Since the voltage generated by LDO 31 is stable even when the load fluctuates, monitoring voltage Vm constantly maintains approximately 2.5 V as illustrated in the following (Equation 1).

$$Vm = VDD \times Rv2/(Rv1+Rv2) = 5V \times 100k\Omega \times 200k\Omega = 2.5V \quad \text{(Equation 1)}$$

Figure 5:
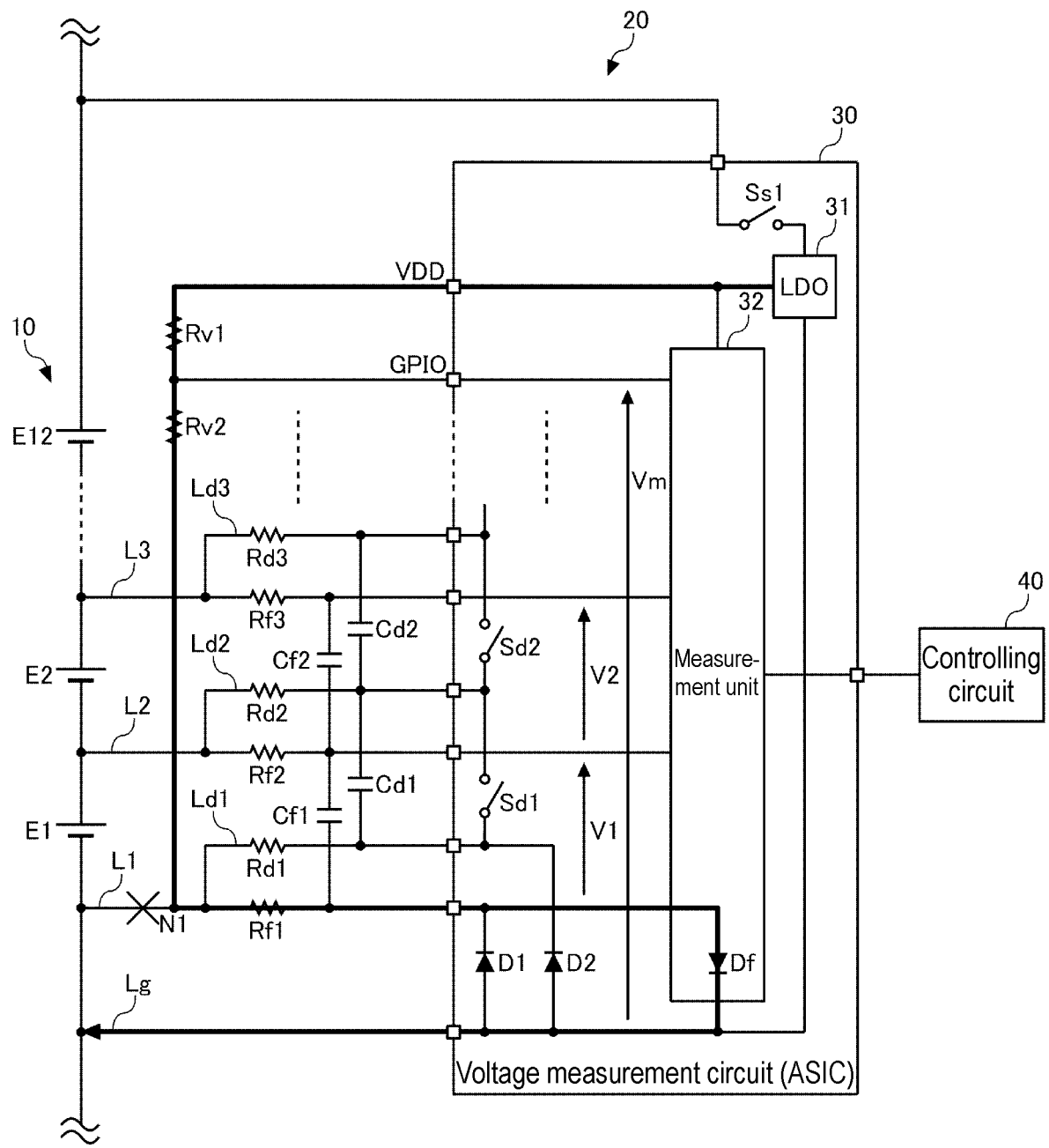
FIG. 5 is a view illustrating a current flowing when a lowermost voltage measurement line is disconnected in the power supply system of FIG. 4.

FIG. 5 is a view illustrating a current flowing when lowermost voltage measurement line L1 is disconnected in power supply system 1 of FIG. 4. In a state where lowermost voltage measurement line L1 is disconnected, a current flows from the output terminal of LDO 31 to ground potential line Lg via first voltage dividing resistor Rv1, second voltage dividing resistor Rv2, first filter resistor Rf1, and forward diode Df. In a state where lowermost voltage measurement line L1 is disconnected, the potential of lowermost voltage measurement line L1 rises, by the amount of forward voltage Vf of forward diode Df, from the lower reference potential (ground potential) of voltage measurement circuit 30.

For example, a case where the value of first filter resistor Rf1 is 1 kΩ and forward voltage Vf of forward diode Df is 0.7 V will be considered. In a state where lowermost voltage measurement line L1 is disconnected, monitoring voltage Vm is 2.861 V as illustrated in the following (Equation 2). That is, monitoring voltage Vm at the time of disconnection of lowermost voltage measurement line L1 rises by about 0.36 V from monitoring voltage Vm at the normal time.

$$Vm = Vf + (VDD-Vf) \times (Rv2+Rf1)/(Rv1+Rv2+Rf1) = 0.7V + (4.3V \times 101k\Omega/201k\Omega) = 2.861V \quad \text{(Equation 2)}$$

The first set value is set to a value in which a margin is considered to about 0.36 V. When measured monitoring voltage Vm is higher than monitoring voltage Vm at the normal time by greater than or equal to a first set value, controlling circuit 40 determines that lowermost voltage measurement line L1 is disconnected.

Figure 6:
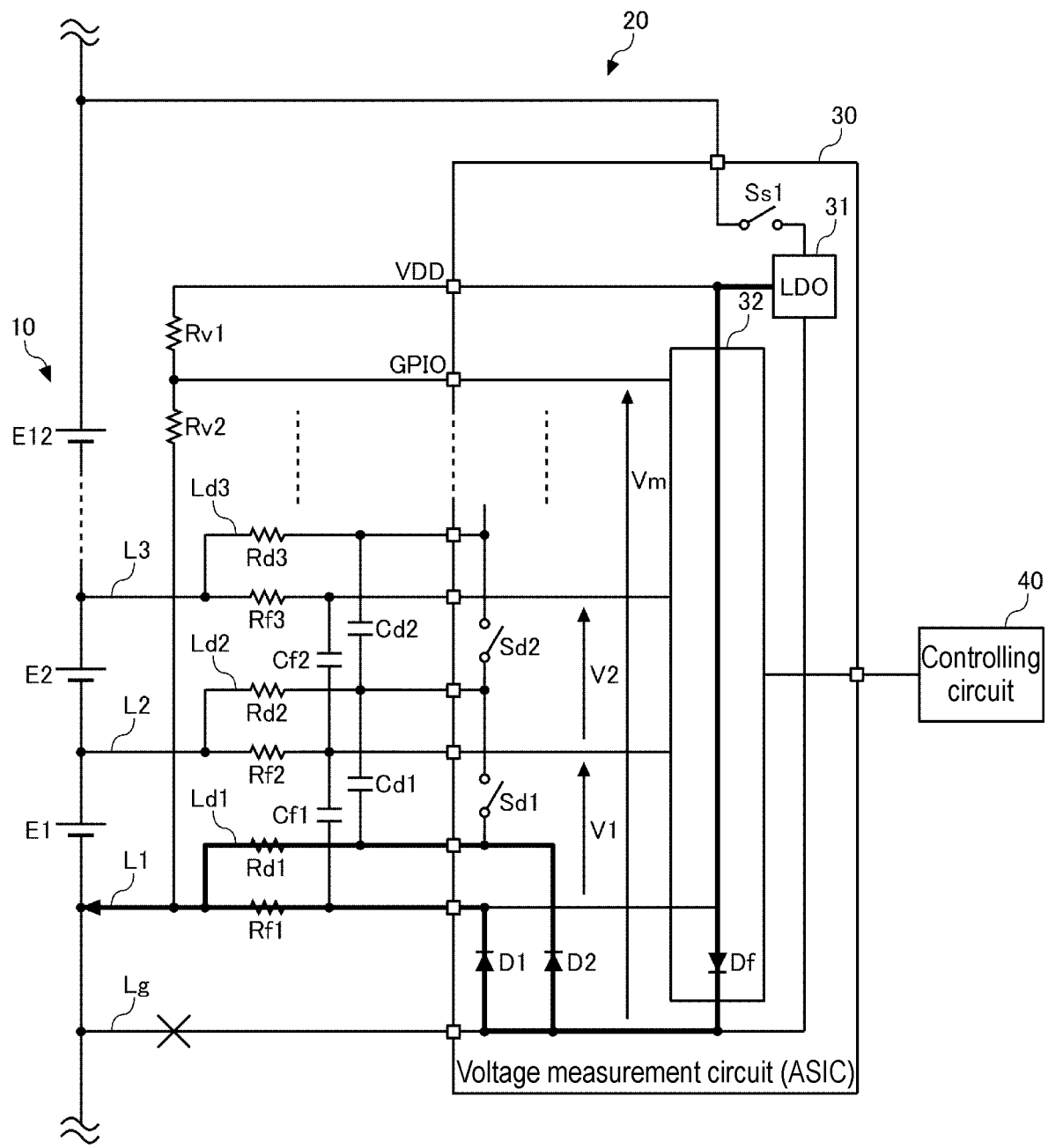
FIG. 6 is a view illustrating a current flowing when a ground potential line is disconnected in the power supply system of FIG. 4.

FIG. 6 is a view illustrating a current flowing when ground potential line Lg is disconnected in power supply system 1 of FIG. 4. When ground potential line Lg is disconnected, similarly to the comparative example illustrated in FIG. 3, the consumption current of measurement unit 32 flows to the negative-electrode terminal of first cell E1 through two paths of a path of first protection diode D1 and first filter resistor Rf1, and a path of second protection diode D2 and first discharge resistor Rd1.

Hereinafter, a case where the value of first filter resistor Rf1 is 1 kΩ, the value of first discharge resistor Rd1 is 100Ω, the consumption current of measurement unit 32 is 10 mA, forward voltage Vf of first protection diode D1 is 0.7 V, and forward voltage Vf of second protection diode D2 is 0.7 V will be considered. Hereinafter, first filter resistor Rf1 and first discharge resistor Rd1 are collectively referred to as terminal resistor Rt, and a voltage drop caused by a current flowing through terminal resistor Rt is referred to as Vrt.

In a state where ground potential line Lg is disconnected, monitoring voltage Vm is 1.7 V as illustrated in the following (Equation 3). That is, in the state where ground potential line Lg is disconnected, the potential of lowermost voltage measurement line L1 drops, by the amount of forward voltage Vf of protection diodes D1 and D2 and voltage drop Vrt of terminal resistor Rt, from the lower reference potential (ground potential) of voltage measurement circuit 30. Under the above condition, the voltage drops by about 1.6 V. Therefore, monitoring voltage Vm at the time of disconnection of ground potential line Lg drops by about 0.8 V from monitoring voltage Vm at the normal time.

$$Vm = (Vf+Vrt)+(VDD-(Vf+Vrt)) \times Rv2/(Rv1+Rv2) = (0.7V 0.9V)+(5V-(-0.7V-0.9V)) \times 100k\Omega/200k\Omega) = 1.7V \quad \text{(Equation 3)}$$

The second set value is set to a value in which a margin is considered to about 0.8 V. When measured monitoring voltage Vm is lower than monitoring voltage Vm in the normal state by greater than or equal to a second set value, controlling circuit 40 determines that ground potential line Lg is disconnected.

As described above, according to the present exemplary embodiment, it is possible to highly accurately detect disconnection of lowermost voltage measurement line L1 or ground potential line Lg of voltage measurement circuit 30. Fluctuation of monitoring voltage Vm at the time of disconnection of lowermost voltage measurement line L1 or ground potential line Lg is smaller than voltage fluctuation at the time of disconnection of other voltage measurement lines, but since monitoring voltage Vm at the normal time is stable, the possibility of erroneous detection is low. That is, since the voltage in which the output voltage of LDO 31 is resistor-divided is monitored, monitoring voltage Vm is hardly affected even if the cell voltage fluctuates due to moving of the electric vehicle or the like, and disconnection of lowermost voltage measurement line L1 or ground potential line Lg can be easily and highly accurately determined based on the fluctuation of monitoring voltage Vm.

Unlike detection of disconnection of a general voltage measurement line, it is not necessary to perform switching control of a switch for turning on/off a cell discharge circuit or a current source, and it is possible to constantly detect disconnection of lowermost voltage measurement line L1 or ground potential line Lg. In disconnection detection that requires switching control of a switch, a period in which the cell voltage cannot be measured occurs, but in the disconnection detection according to the exemplary embodiment, a period in which the cell voltage cannot be measured basically does not occur.

A GPIO terminal provided in a general ASIC can be used, and additional components are only two of first voltage dividing resistor Rv1 and second voltage dividing resistor Rv2. Therefore, addition of a simple configuration makes it possible to configure a diagnosis circuit for disconnection of lowermost voltage measurement line L1 or ground potential line Lg. Whether or not the diagnostic circuit is normally operating can be determined by whether or not 2.5 V has been successfully measured, and therefore the presence or absence of a failure of the diagnostic circuit can be easily detected without requiring an additional failure detection circuit.

By supplying a current from LDO 31 to the voltage dividing resistor, a current does not flow through the voltage dividing resistor during a period in which voltage measurement circuit 30 is not operating, and wasteful consumption current does not occur. Since LDO 31 generates an operating voltage by stepping down the voltage between both ends of power storage module 10, the capacitance balance of the plurality of cells E1 to E12 constituting power storage module 10 is not lost due to the consumption current of the voltage dividing resistor. Since the lower side of the voltage dividing resistor is connected to the outside of first filter resistor Rf1, the current flowing through the voltage dividing resistor at the normal time does not flow into first filter resistor Rf1. Therefore, due to the current flowing through the voltage dividing resistor at the normal time, the voltage measurement accuracy of lowermost cell E1 will not deteriorate.

By the fluctuation direction of monitoring voltage Vm, it is possible to specify whether lowermost voltage measurement line L1 is disconnected or ground potential line Lg is disconnected. That is, it can be determined that lowermost voltage measurement line L1 is disconnected when monitoring voltage Vm rises, and that ground potential line Lg is disconnected when monitoring voltage Vm drops.

The present disclosure has been described above in accordance with the exemplary embodiment. It will be understood by the person of ordinary skill in the art that the exemplary embodiment is merely an example, other modified examples in which configuration elements and processing processes of the exemplary embodiment are variously combined are possible, and the other modified examples still fall within the scope of the present disclosure.

In the above-described exemplary embodiment, an example has been described in which the voltage generated by LDO 31 is used as the voltage applied to the voltage dividing resistor. In this regard, a fixed voltage generated by another power source circuit may be applied to the voltage dividing resistor. For example, a fixed voltage generated by a DC/DC converter that steps down the voltage of a lead battery of 12 V to 5 V may be applied. Note that the fixed voltage generated by the DC/DC converter can be used as the operating voltage of voltage measurement circuit 30 without providing LDO 31.

In FIG. 4, a configuration in which forward diode Df is omitted is also possible. In that configuration, in a case where lowermost voltage measurement line L1 is disconnected, monitoring voltage Vm rises to 5 V. In this configuration, it is difficult to determine whether or not the diagnostic circuit is normally operating only by whether or not 2.5 V can be measured, but other configurations are the same as those of the above exemplary embodiment.

In the above-described exemplary embodiment, an example in which power supply system 1 is used for an electric vehicle has been described. In this respect, it can also be used for electric flight vehicles such as a drone, electric ship, stationary power storage systems, and electronic equipment such as laptop PCs and smartphones.

The exemplary embodiment may be specified by the following items.

Item 1

Management device (20) including:
voltage measurement circuit (30) that measures voltage of each of a plurality of cells (E1 to E12) connected in series;
a plurality of voltage measurement lines (L1, L2, L3, . . . ) that connect between respective nodes of plurality of cells (E1 to E12) and respective voltage measurement terminals of voltage measurement circuit (30);
lower reference potential line (Lg) that connects between a lower node of lowermost cell (E1) of plurality of cells (E1 to E12) and a lower reference terminal of voltage measurement circuit (30);
voltage dividing resistor (Rv1 or Rv2) that is connected between a predetermined fixed potential and lowermost voltage measurement line (L1); and
controlling circuit (40) that monitors voltage between a voltage dividing point potential of voltage dividing resistor (Rv1 or Rv2) and a lower reference potential of voltage measurement circuit (30) and diagnoses presence or absence of disconnection of lowermost voltage measurement line (L1) or lower reference potential line (Lg).

This makes it possible to highly accurately detect disconnection of lowermost voltage measurement line (L1) or lower reference potential line (Lg).

Item 2

Management device (20) according to Item 1, in which a voltage between a voltage dividing point potential of voltage dividing resistor (Rv1 or Rv2) and a lower reference potential of voltage measurement circuit (30) is higher than a voltage at a normal time by greater than or equal to a first set value, controlling circuit (40) diagnoses that lowermost voltage measurement line (L1) is disconnected.

This makes it possible to highly accurately detect disconnection of lowermost voltage measurement line (L1).

Item 3

Management device (20) according to Item 1 or 2, in which when a voltage between a voltage dividing point potential of voltage dividing resistor (Rv1 or Rv2) and a lower reference potential of voltage measurement circuit (30) is lower than a voltage at a normal time by greater than or equal to a second set value, controlling circuit (40) diagnoses that lower reference potential line (Lg) is disconnected.

This makes it possible to highly accurately detect disconnection of lower reference potential line (Lg).

Item 4

Management device (20) according to any one of Items 1 to 3 further including:
 a plurality of filter resistors (Rf1, Rf2, Rf3, . . . ) respectively inserted into the plurality of voltage measurement lines (L1, L2, L3, . . . ),
 in which a lower side of voltage dividing resistor (Rv1 or Rv2) is connected to a node on lowermost voltage measurement line (L1) on lowermost cell (E1) side relative to filter resistor (Rf1).

This makes it possible to prevent an adverse effect on the voltage measurement accuracy of lowermost cell (E1).

Item 5

Management device (20) according to any one of Items 1 to 4 further including:
 DC/DC converter (31) that steps down a voltage between both ends of the plurality of cells (E1 to E12) to generate a power source voltage of voltage measurement circuit (30),
 in which an output potential of DC/DC converter (31) is applied to an upper side of the voltage dividing resistor (Rv1 or Rv2).

This makes it possible to reduce the influence of load fluctuation and to measure a stable voltage dividing voltage.

Item 6

Management device (20) according to any one of Items 1 to 5 further including forward diode (Df) connected or formed between lowermost voltage measurement line (L1) and lower reference potential line (Lg) in an orientation in which lower reference potential line (Lg) side becomes a cathode.

This makes it possible to detect the presence or absence of failure of the voltage dividing resistor (Rv1 or Rv2).

Item 7

Management device (20) according to any one of Items 1 to 6 further including a plurality of protection diodes (D1) each connected between the plurality of voltage measurement lines (L1, L2, L3, . . . ) and lower reference potential line (Lg) in an orientation in which lower reference potential line (Lg) side becomes an anode.

This makes it possible to protect voltage measurement circuit (30) from overvoltage and the like.

Item 8

A power supply system including:
 a plurality of cells (E1 to E12) connected in series; and
 management device (20) according to any one of Items 1 to 7 that manages the plurality of cells (E1 to E12).

This makes it possible to construct power supply system (1) capable of highly accurately detecting disconnection of lowermost voltage measurement line (L1) or lower reference potential line (Lg).

REFERENCE MARKS IN THE DRAWINGS

1: power supply system
10: power storage module
20: management device
30: voltage measurement circuit
31: LDO
32: measurement unit
40: controlling circuit
E1-E12: cell
L1-L3: voltage measurement line
Ld1-Ld3: discharge line
Lg: ground potential line
Rf1-Rf3: filter resistor
Rd1-Rd3: discharge resistor
Rv1-Rv2: voltage dividing resistor
Cf1, Cf2, Cd1, Cd2: capacitance
Sd1-Sd2: discharge switch
Ss1: power source switch
D1: first protection diode
D2: second protection diode
Df: forward diode

The invention claimed is:
1. A management device comprising:
 a voltage measurement circuit that measures a voltage of each of a plurality of lithium ion battery cells connected in series included in a power storage module;
 a plurality of voltage measurement lines that connect between nodes of the plurality of lithium ion battery cells and voltage measurement terminals of the voltage measurement circuit;
 a lower reference potential line that connects between a lower node of a lowermost cell of the plurality of lithium ion battery cells and a lower reference terminal of the voltage measurement circuit;
 voltage dividing resistors that are connected between a predetermined fixed potential and a lowermost voltage measurement line among the plurality of voltage measurement lines; and
 a controlling circuit that monitors a voltage between a voltage dividing point potential of the voltage dividing resistors and a lower reference potential of the voltage measurement circuit and diagnoses presence or absence of disconnection of the lowermost voltage measurement line or the lower reference potential line.
2. The management device according to claim 1, wherein when a voltage between the voltage dividing point potential of the voltage dividing resistors and the lower reference potential of the voltage measurement circuit is higher than the voltage at a normal time by greater than or equal to a first set value, the controlling circuit diagnoses that the lowermost voltage measurement line is disconnected.

3. The management device according to claim 1, wherein when a voltage between the voltage dividing point potential of the voltage dividing resistors and the lower reference potential of the voltage measurement circuit is lower than a voltage at a normal time by greater than or equal to a second set value, the controlling circuit diagnoses that the lower reference potential line is disconnected.

4. The management device according to claim 1, further comprising a plurality of filter resistors respectively inserted into the plurality of voltage measurement lines, wherein a lower side of the voltage dividing resistors is connected to a node on the lowermost voltage measurement line of the lowermost cell relative to a filter resistor, the plurality of filter resistors including the filter resistor.

5. The management device according to claim 1, further comprising a DC/DC converter that steps down a voltage between both ends of the plurality of lithium ion battery cells to generate a power source voltage of the voltage measurement circuit, wherein an output potential of the DC/DC converter is applied to an upper side of the voltage dividing resistors.

6. The management device according to claim 1, further comprising a forward diode connected or formed between the lowermost voltage measurement line and the lower reference potential line in an orientation in which the lower reference potential line is connected to a cathode of the forward diode.

7. The management device according to claim 1, further comprising a plurality of protection diodes each connected between the plurality of voltage measurement lines and the lower reference potential line in an orientation in which the lower reference potential line is connected to an anode of corresponding one of the plurality of protection diodes.

8. A power supply system comprising:
   a plurality of lithium ion battery cells connected in series included in a power storage module; and
   the management device according to claim 1 that manages the plurality of lithium ion battery cells.

9. The management device according to claim 1, wherein the voltage dividing resistors are connected between the predetermined fixed potential and only the lowermost voltage measurement line among the plurality of voltage measurement lines.

* * * * *